United States Patent [19]

Brunner et al.

[11] Patent Number: 5,359,020
[45] Date of Patent: Oct. 25, 1994

[54] HARDENABLE COMPOSITIONS COMPRISING BISMALEIMIDES, ALKENYLPHENOLS AND PHENOL DIALLYL ETHERS

[75] Inventors: Rudolf Brunner, Belfaux; René Huwyler, Aesch; Andreas Kramer, Düdingen, all of Switzerland

[73] Assignee: Ciba-Geigy Corporation, Ardsley, N.Y.

[21] Appl. No.: 701,264

[22] Filed: May 16, 1991

[30] Foreign Application Priority Data

May 22, 1990 [CH] Switzerland ............. 1730/90-5

[51] Int. Cl.$^5$ ............. C08F 222/40; C08F 228/02; C08F 216/12
[52] U.S. Cl. ............. 526/262; 526/286; 526/313; 526/333; 526/334
[58] Field of Search ............. 526/262

[56] References Cited

U.S. PATENT DOCUMENTS

| | | | |
|---|---|---|---|
| 4,100,140 | 7/1978 | Zahir et al. | 526/90 |
| 4,288,583 | 9/1981 | Zahir et al. | 526/262 |
| 4,298,720 | 11/1981 | Yamazaki et al. | 526/262 |
| 4,689,378 | 8/1987 | Chaudhari et al. | 526/259 |
| 4,752,641 | 6/1988 | Koyama et al. | 526/261 |
| 4,853,449 | 8/1989 | Domeier | 526/259 |

*Primary Examiner*—Joseph L. Schofer
*Assistant Examiner*—Wu C. Cheng
*Attorney, Agent, or Firm*—William A. Teoli, Jr.

[57] ABSTRACT

Compositions comprising
  A) compounds of formula I

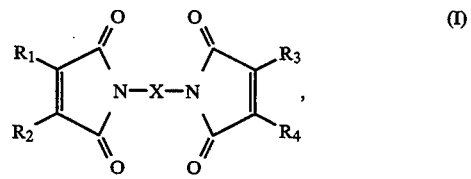

wherein $R_1$, $R_2$, $R_3$ and $R_4$ are identical or different and each is hydrogen or methyl, and X is a divalent organic radical comprising from 2 to 60 carbon atoms,
B) compounds of formula II, III or IV

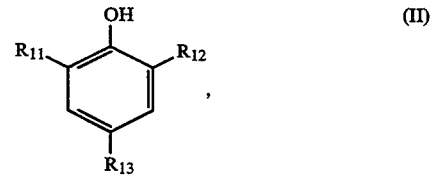

wherein each of $R_{11}$, $R_{12}$ and $R_{13}$, independently of the others, is a hydrogen atom or a $C_3$–$C_{10}$alkenyl group, at least one of the radicals $R_{11}$ to $R_{13}$ being an alkenyl group,

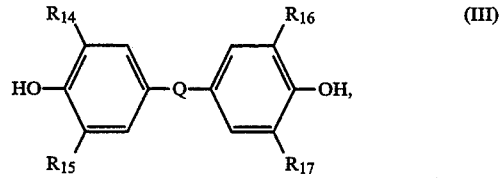

wherein Q is a direct bond, methylene, 2,2-propylidene, —CO—, —O—, —S—, —SO— or —SO$_2$— and each of $R_{14}$, $R_{15}$, $R_{16}$ and $R_{17}$, independently of the others, is a hydrogen atom or a $C_3$–$C_{10}$alkenyl group, at least one of the radicals $R_{14}$ to $R_{17}$ being an alkenyl group, or (Abstract continued on next page.)

ABSTRACT

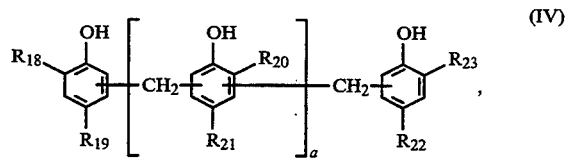

wherein each of $R_{18}$, $R_{19}$, $R_{20}$, $R_{21}$, $R_{22}$ and $R_{23}$, independently of the others, is a hydrogen atom, $C_1$–$C_4$alkyl or $C_3$–$C_{10}$ alkenyl, at least one of the radicals $R_{18}$ to $R_{23}$ being an alkenyl group, and a is a number from 0 to 10, and
C) compounds of formula V

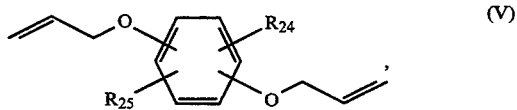

wherein $R_{24}$ and $R_{25}$ are identical or different and each is hydrogen or $C_1$–$C_{10}$alkyl, or of formula VI

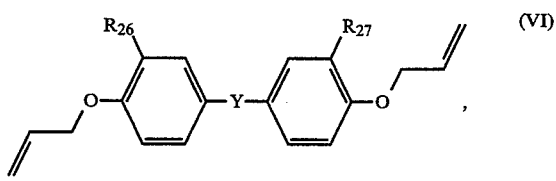

wherein $R_{26}$ and $R_{27}$ are identical or different and each is hydrogen or $C_1$–$C_8$alkyl, and Y is a direct bond, methylene, 2,2-propylidene, —O—, —S—, —SO—, —SO$_2$— or —CO—, are distinguished by good storage stability, favourable processing behaviour and high glass transition temperatures.

12 Claims, No Drawings

HARDENABLE COMPOSITIONS COMPRISING BISMALEIMIDES, ALKENYLPHENOLS AND PHENOL DIALLYL ETHERS

The present invention relates to compositions comprising bismaleimides, alkenylphenols and phenol diallyl ethers and to a process for the preparation of hardened products using the compositions according to the invention.

Compositions based on bismaleimides and alkenylphenols are generally known to the person skilled in the art. U.S. Pat. No. 4,100,140 and U.S. Pat. No. 4,288,583 may be cited as basic examples of such bismaleimide systems. Compositions based on bismaleimides and allyl phenol ethers are also known from U.S. Pat. No. 4,853,449. These mentioned hardenable mixtures do not, however, satisfy the stringent requirements, for example regarding processing behaviour, in every respect since they are generally highly viscous mixtures even at the processing temperature. In addition, bismaleimides tend to crystallise out in such systems. For example, bisphenol A diallyl ether is a poor solvent for bismaleimides, so that mixtures thereof are not very stable and the bismaleimides crystallise out again.

It has surprisingly now been found that compositions comprising bismaleimides and alkenylphenols and modified by phenol diallyl ethers exhibit a significantly lower system viscosity, which is advantageous for processing. At elevated temperature, such compositions have a longer, and accordingly more favourable, pot life. It has also been found that the compositions are stable at the processing temperature (from 80° to 160° C.) and also at room temperature, that is to say, the bismaleimide does not crystallise out.

The present invention accordingly relates to compositions comprising

A) compounds of formula I

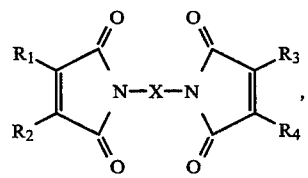

wherein $R_1$, $R_2$, $R_3$ and $R_4$ are identical or different and each is hydrogen or methyl, and X is a divalent organic radical comprising from 2 to 60 carbon atoms, B) compounds of formula II, III or IV

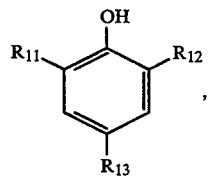

wherein each of $R_{11}$, $R_{12}$ and $R_{13}$, independently of the others, is a hydrogen atom or a $C_3$-$C_{10}$alkenyl group, at least one of the radicals $R_{11}$ to $R_{13}$ being an alkenyl group,

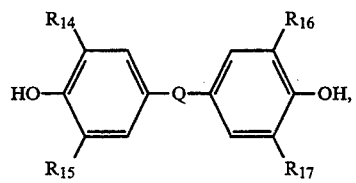

wherein Q is a direct bond, methylene, 2,2-propylidene, —CO—, —O—, —S—, —SO— or —SO$_2$— and each of $R_{14}$, $R_{15}$, $R_{16}$ and $R_{17}$, independently of the others, is a hydrogen atom or a $C_3$-$C_{10}$alkenyl group, at least one of the radicals $R_{14}$ to $R_7$ being an alkenyl group, or

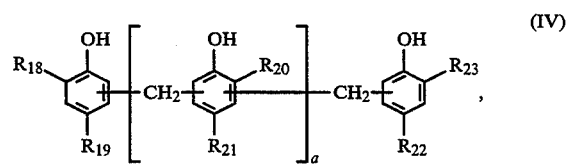

wherein each of $R_{18}$, $R_{19}$, $R_{20}$, $R_{21}$, $R_{22}$ and $R_{23}$, independently of the others, is a hydrogen atom, $C_1$-$C_4$alkyl or $C_3$-$C_{10}$alkenyl, at least one of the radicals $R_{18}$ to $R_{23}$ being an alkenyl group, and a is a number from 0 to 10, and C) compounds of formula V

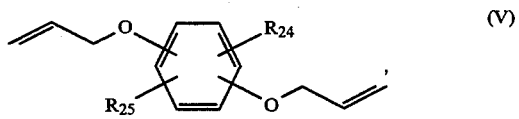

wherein $R_{24}$ and $R_{25}$ are identical or different and each is hydrogen or $C_1$-$C_{10}$alkyl, or of formula VI

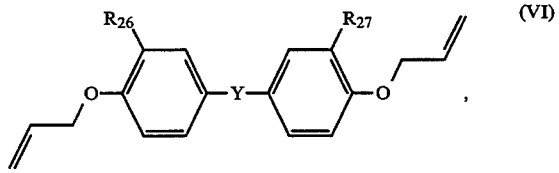

wherein $R_{26}$ and $R_{27}$ are identical or different and each is hydrogen or $C_1$-$C_8$alkyl, and Y is a direct bond, methylene, 2,2-propylidene, —O—, —S—, —SO—, —SO$_2$— or —CO—.

The bismaleimides of formula I are known compounds and are described, for example, in U.S. Pat No. 4,100,140. They are preferably compounds of formula I wherein X is —(CH$_2$)$_p$—, with p=from 2 to 20, phenylene, xylylene, naphthylene, cyclopentylene, 1,5,5-trimethylcyclohexylene-1,3; cyclohexylene-1,4; 1,4-bis(methylene)cyclohexylene, the radical of 4,4'-bicyclohexylmethane or a group of formula VII

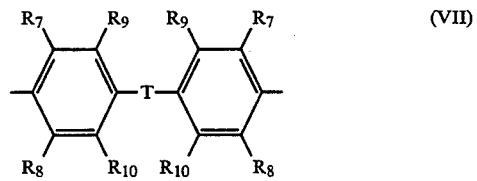

wherein $R_7$ and $R_8$ are identical or different and each is hydrogen or $C_1$-$C_4$alkyl, each of $R_9$ and $R_{10}$, independently of the other, is a hydrogen or halogen atom, and T is methylene, 2,2-propylidene, —CO—, —O—, —S— or—SO$_2$—. Compounds of formula I wherein $R_1$, $R_2$, $R_3$ and $R_4$ are hydrogen are also preferred.

Especially preferred compounds of formula I are those wherein X is hexamethylene, trimethylhexamethylene, 1,5,5-trimethylcyclohexylene-1,3; the radical of 4,4'-bicyclohexylmethane or a group of formula VII wherein T is methylene, 2,2-propylidene, —O— or —S—.

There are especially used compounds of formula I wherein $R_1$, $R_2$, $R_3$ and $R_4$ are hydrogen and X is a group of formula VII wherein $R_7$ and $R_8$ are identical or different and each is hydrogen, methyl or ethyl, $R_9$ and $R_{10}$ are hydrogen and T is methylene.

It is, of course, also possible to use mixtures of two or more different bismaleimides. Preference is given to mixtures of N,N'-4,4'-diphenylmethane bismaleimide and compounds of formula I wherein $R_1$, $R_2$, $R_3$ and $R_4$ are hydrogen and X is a group of formula VII wherein $R_7$ and $R_8$ are identical or different and each is methyl or ethyl, $R_9$ and $R_{10}$ are hydrogen and T is methylene. The molar ratio of the unsubstituted to the substituted bismaleimides is in this case preferably from 1: 0.9 to 1.1.

Examples of bismaleimides of formula I are: N,N'-ethylene bismaleimide, N,N'-hexamethylene bismaleimide, N,N'-trimethylhexylene bismaleimide, N,N'-m-phenylene bismaleimide, N,N'-4,4'-diphenylmethane bismaleimide, N,N'-4,4'-diphenyl ether bismaleimide, N,N'-(1,5,5-trimethylcyclohexylene-1,3) bismaleimide, N,N'-4,4 '-dicyclohexylmethane bismaleimide, N,N'-p-xylylene bismaleimide, N,N'-4,4'-di-(2-ethyl-6-methylphenyl)methane bismaleimide, N,N'-4,4'-di-(2,6-dimethylphenyl)methane bismaleimide, N,N'-4,4'-di-(2,6-diethylphenyl)methane bismaleimide, N,N'-4,4'-di-(2,6-diisopropylphenyl)methane bismaleimide, N,N'-4,4'-di-(2-ethyl-6-isopropylphenyl)methane bismaleimide and N,N '-4,4'-di-(3-chloro-2,6-diethylphenyl)methane bismaleimide.

The preparation of the compounds of formula I is known and is carried out, for example, by reacting the unsubstituted or substituted maleic acid anhydride with the corresponding diamines. Customary methods are described in U.S. Pat. No. 3,010,290 or GB-P 1 137 592.

The alkenylphenols of formulae II to IV are also known compounds which are described, for example, in U.S. Pat. No. 4,100,140 and U.S. Pat. No. 4,288,583. The compounds of formulae II to IV preferably comprise an allyl, methallyl or 1-propenyl group as alkenyl group.

Of the compounds of formulae II to IV there are preferably used in the compositions according to the invention compounds of formula III wherein Q is methylene, 2,2-propylidene, —O—, —S—, —CO— or —SO$_2$-, each of $R_{14}$ and $R_{16}$ is an allyl radical and each of $R_{15}$ and $R_{17}$ is a hydrogen atom.

Alkenylphenols of formula III wherein Q is 2,2-propylidene, each of $R_{14}$ and $R_{16}$ is an allyl radical and each of $R_{15}$ and $R_{17}$ is a hydrogen atom are especially preferred.

Examples of alkenyl-substituted phenols and polyols are o,o'-diallyl bisphenol A, 4,4'-dihydroxy-3,3'-diallylbiphenyl, bis(4-hydroxy-3-allylphenyl)methane, 2,2-bis(4-hydroxy3,5-diallylphenyl)propane, eugenol (4-allyl-2-methoxyphenol), o,o '-dimethallyl bisphenol A, 4,4'-dihydroxy-3,3'-dimethallylbiphenyl, bis(4-hydroxy-3-methallylphenyl)methane, 2,2-bis(4-hydroxy-3,5-dimethallylphenyl)propane and 4-methallyl-2-methoxyphenol.

The preparation of the alkenylphenols is known and is carried out, for example, by reacting the corresponding phenols and, for example, allyl chloride, in the presence of an alkali metal hydroxide in a suitable solvent, the products obtained then being subjected to a Claisen rearrangement. Methods of that type are described, for example, in U.S. Pat. No. 4,100,140 and U.S. Pat. No. 4,288,583.

The phenol diallyl ethers of formulae V and VI are also known compounds which are described, for example, in U.S. Pat. No. 4,853,449. Preferred are compounds of formula VI wherein $R_{26}$ and $R_{27}$ are identical or different and each is hydrogen, methyl or ethyl, and Y is a direct bond, methylene, 2,2-propylidene, —O—, —S—, —SO—, —SO$_2$— or —CO—.

A compound of formula VI wherein $R_{26}$ and $R_{27}$ are hydrogen and Y is 2,2-propylidene is especially preferred.

The preparation of the phenol diallyl ethers is known and is carried out, for example, by reacting the corresponding phenols and, for example, allyl chloride, in the presence of an alkali metal hydroxide or carbonate in a suitable solvent. Methods of that type are described, for example, in U.S. Pat. No. 4,853,449.

In general, the compositions according to the invention comprise, per mole of component A, from 0.4 to 1.5 mol, preferably from 0.5 to 1.2 mol, of components B and C.

The compositions according to the invention also generally comprise, per mole of component B, from 0.1 to 4 mol of component C.

The compositions according to the invention can be prepared simply by mixing the components together, or by heating the composition at from 75° to 160° C. for approximately from 10 to 60 minutes. In order to facilitate the reaction, it is also possible optionally to use solvents, especially volatile solvents, such as chlorinated hydrocarbons, esters, ether alcohols or tetrahydrofuran. The solvent is removed after the reaction.

The hardening of the compositions according to the invention generally takes place at temperatures of from 100° to 300° C. for a period sufficient to achieve hardening.

During hardening, a network is formed with a high cross-linking density. The term "hardening" used here accordingly denotes the conversion of the low-viscosity resin mixtures into insoluble and non-meltable cross-linked products. High-performance materials can thus be produced, such as, for example, fibre-reinforced composites, structural adhesives, laminating resins or electroresins, which can be exposed to high temperatures.

In any processing phase before hardening, the compositions according to the invention can be mixed with customary modifiers, such as, for example, extenders, fillers and reinforcing agents, pigments, dyestuffs, organic solvents, plasticisers, agents for improving the dry-tackiness, (tackifiers), gums or accelerators. Suitable extenders, reinforcing agents, fillers and pigments are, for example: coal-tar, bitumen, glass fibres, boron fibres, carbon fibres, cellulose, polyethylene powder, polypropylene powder, mica, asbestos, quartz powder, gypsum, antimony trioxide, bentonites, silicon dioxide aerogel ("Aerosil"), lithopone, barite, titanium dioxide, carbon black, graphite, iron oxide or metal powders. such as, for example, aluminium or iron powder. Other customary additives, such as, for example, flame retardants, thixotropic agents, flow control agents, such as silicones, cellulose acetate butyrate, polyvinyl butyrate, waxes, stearates and the like (which can in some cases also be used as mould release agents) may also be added to the hardenable mixtures.

The hardenable compositions can be prepared in customary manner using known mixing units, such as stirrers, kneaders, roller bodies and the like.

The compositions according to the invention are distinguished by a very good processing behaviour, good solubility in customary organic solvents, good stability in the melt or in solution and by good thermal and mechanical properties of the hardened products. The products obtained also have good electrical properties, have high glass transition temperatures and are not brittle. The compositions according to the invention can also be used without difficulty as melts, for example for impregnation.

The present invention accordingly relates also to a process for the preparation of hardened products using the compositions according to the invention.

The described compositions according to the invention can be used in various fields, such as, for example, in prepregs, laminates, composites, printed circuit boards, castings, moulded articles, adhesives and coatings. Their use in the manufacture of fibre-reinforced composites, which are very important in the aeronautical industry, is of particular interest. For example, the modified resins can be used to preimpregnate various fibrous materials that are used as honeycomb skins or as structural parts. Processes for the manufacture of prepregs are known to the person skilled in the art. There may be used as fibrous materials, for example, graphite, glass and Kevlar. Processes for the manufacture of laminates are also known. Laminates of various thicknesses can be manufactured, for example, by compression moulding or autoclave moulding. The mixtures according to the invention can also be used successfully as adhesion-promoters.

Some preferred embodiments of the present invention are described in the following Examples.

EXAMPLE 1

25 g of o,o'-diallyl bisphenol A and 12.5 g of bisphenol A diallyl ether are heated to 150° C. 50 g of N,N'-4,4'-diphenylmethane bismaleimide are then added, with stirring, and the mixture is stirred for a further 15 minutes at from 125° to 130° C. Part of the mixture is degassed in vacuo and poured into an aluminium mould (4 mm) heated to 180° C. and is hardened for 1 hour at 180° C., for 2 hours at 200° C. and for 6 hours at 250° C. The remainder is used for DSC and viscosity measurements. The following properties are measured:

| | |
|---|---|
| viscosity $\eta_{100}$: | 196 mPa · s |
| $T_{max}$ DSC: | 260° C. |
| $T_g$ (TMA): | 311° C. |
| flexural strength: (in accordance with ISO 178) | 169 MPa |
| elongation at break: | 5.6% |

EXAMPLE 2

A mixture of 25 g of N,N'-4,4'-diphenylmethane bismaleimide and 25 g of N,N'-4,4'-di-(2-ethyl-6-methylphenyl)methane bismaleimide is added to a mixture, heated to 100° C., of 22.5 g of o,o'-diallyl bisphenol A and 11.5 g of bisphenol A diallyl ether and the batch is stirred for 15 minutes at 100° C. Hardening is then carded out in an aluminium mould as described in Example 1 and the remainder is used for DSC and viscosity measurements. The following properties are measured:

| | |
|---|---|
| viscosity $\eta_{100}$: | 345 mPa · s |
| $T_{max}$ DSC: | 265° C. |
| $T_g$ (TMA): | 298° C. |
| flexural strength: (in accordance with ISO 178) | 173 MPa |
| elongation at break: | 8.6% |

EXAMPLE 3

50 g of N,N'-4,4'-di-(2-ethyl-6-methylphenyl)methane bismaleimide are added to a mixture, heated to 150° C., of 10 g of bisphenol A diallyl ether and 20.5 g of o,o'-diallyl bisphenol A and the batch is stirred at 125° C. Part of the mixture is degassed in vacuo and poured into an aluminium mould (4 mm) heated to 200° C. and is hardened for 1 hour at 200° C., for 2 hours at 220° C. and for 6 hours at 270° C. The remainder is used for DSC and viscosity measurements. The following properties are measured:

| | |
|---|---|
| viscosity $\eta_{100}$: | 300 mPa · s |
| $T_{max}$ DSC: | 277° C. |
| $T_g$ (TMA): | 302° C. |
| flexural strength: (in accordance with ISO 178) | 145 MPa |
| elongation at break: | 5.5% |

EXAMPLE 4

25 g of o,o'-diallyl bisphenol A, 25 g of bisphenol A diallyl ether and 16.5 g of 2,4-di-allyl-6-methoxyphenol are heated to 150° C. 100 g of N,N'-4,4'-diphenylmethane bismaleimide are then added, with stirring, and the mixture is stirred for a further 15 minutes at from 125° to 130° C. Part of the mixture is degassed in vacuo and poured into an aluminium mould (4 mm) heated to 180° C. and is hardened for 1 hour at 180° C. for 2 hours at 200° C. and for 6 hours at 250° C. The remainder is used for DSC and viscosity measurements. The following properties are measured:

| | |
|---|---|
| viscosity $\eta_{100}$: | 90 mPa · s |
| $T_{max}$ DSC: | 261° C. |
| $T_g$ (TMA): | 350° C. |
| flexural strength: (in accordance with ISO 178) | 150 MPa |
| elongation at break: | 4.7% |

EXAMPLE 5

37.5 g of o,o'-diallyl bisphenol A and 34 g of bisphenol F diallyl ether are heated to 150° C. 100 g of N,N'-4,4'-diphenylmethane bismaleimide are then added, with stirring, and the mixture is stirred for a further 15 minutes at from 125° to 130° C. Part of the mixture is degassed in vacuo and poured into an aluminium mould (4 mm) heated to 180° C. and is hardened for 1 hour at 180° C., for 2 hours at 200° C. and for 6 hours at 250° C. The remainder is used for DSC measurements. The following properties are measured:

| | |
|---|---|
| $T_{max}$ DSC: | 260° C. |
| $T_g$ (TMA): | 338° C. |
| flexural strength: | 150 MPa |
| (in accordance with ISO 178) | |
| elongation at break: | 4.5% |

What is claimed is:

1. A composition comprising
A) a compound of formula I

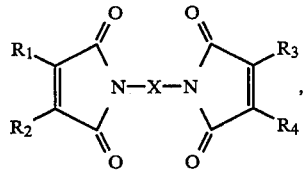

wherein $R_1$, $R_2$, $R_3$ and $R_4$ are identical or different and each is hydrogen or methyl, and X is —($CH_2$)$_p$—, with p=from 2 to 20, phenylene, xylylene, naphthylene, cyclopentylene, 1,5,5-trimethylcyclohexylene-1,3; cyclohexylene-1,4; 1,4-bis(methylene)cyclohexylene, the radical of 4,4'-bicyclohexylmethane or a group of formula VII

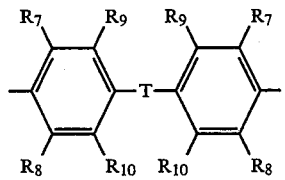

wherein $R_7$ and $R_8$ are identical or different and each is hydrogen or $C_1$-$C_4$alkyl, each of $R_9$ and $R_{10}$, independently of the other, is a hydrogen or halogen atom, and T is methylene, 2,2-propylidene, —CO—, —O—, —S— or—$SO_2$—, B) a compound of formula II, III or IV

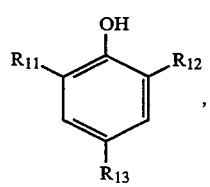

wherein each of $R_{11}$, $R_{12}$ and $R_{13}$, independently of the others, is a hydrogen atom or a $C_3$-$C_{10}$alkenyl group, at least one of the radicals $R_{11}$ to $R_{13}$ being an alkenyl group,

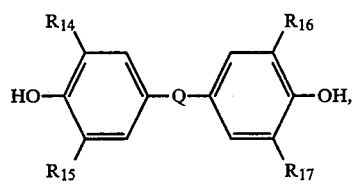

wherein Q is a direct bond, methylene, 2,2-propylidene, —CO—, —O—, —S—, —SO— or —$SO_2$— and each of $R_{14}$, $R_{15}$, $R_{16}$ and $R_{17}$, independently of the others, is a hydrogen atom or a $C_3$-$C_{10}$alkenyl group, at least one of the radicals $R_{14}$ to $R_{17}$ being an alkenyl group, or

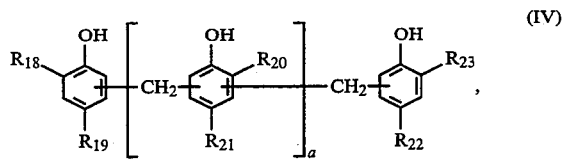

wherein each of $R_{18}$, $R_{19}$, $R_{20}$, $R_{21}$, $R_{22}$ and $R_{23}$, independently of the others, is a hydrogen atom, $C_1$-$C_4$alkyl or $C_3$-$C_{10}$alkenyl, at least one of the radicals $R_{18}$ to $R_{23}$ being an alkenyl group, and a is a number from 0 to 10, and C) a compound of formula V

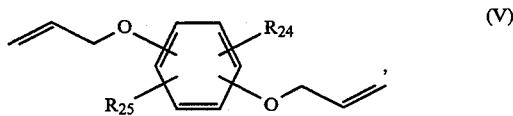

wherein $R_{24}$ and $R_{25}$ are identical or different and each is hydrogen or $C_1$-$C_{10}$alkyl, or of formula VI,

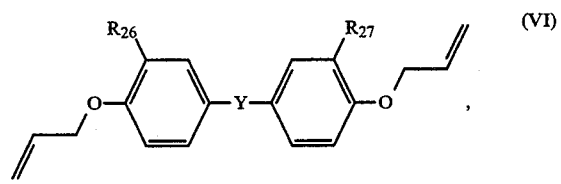

wherein $R_{26}$ and $R_{27}$ are identical or different and each is hydrogen or $C_1$-$C_8$alkyl, and Y is a direct bond, methylene, 2,2-propylidene, —O—, —S—,—SO—, —$SO_2$— or —CO—.

2. A composition according to claim 1 comprising a compound of formula I wherein $R_1$, $R_2$, $R_3$ and $R_4$ are hydrogen.

3. A composition according to claim 1 comprising a compound of formula I wherein X is hexamethylene, trimethylhexamethylene, 1,5,5-trimethylcyclohexylene-1,3; the radical of 4,4'-bicyclohexylmethane or a group of formula VII wherein T is methylene, 2,2-propylidene, —O— or—S—.

4. A composition according to claim 1 comprising a compound of formula I wherein $R_1$, $R_2$, $R_3$ and $R_4$ are hydrogen and X is a group of formula VII wherein $R_7$ and $R_8$ are identical or different and each is hydrogen, methyl or ethyl, $R_9$ and $R_{10}$ are hydrogen and T is methylene.

5. A composition according to claim 1, wherein, in formulae II to IV, the alkenyl group is an allyl, methallyl or 1-propenyl group.

6. A composition according to claim 1, comprising a compound of formula III wherein Q is methylene, 2,2-propylidene, —O—, —S—, —CO— or —$SO_2$-, each of $R_{14}$ and $R_{16}$ is an allyl radical and each of $R_5$ and $R_{17}$ is a hydrogen atom.

7. A composition according to claim 1 comprising a compound of formula III wherein Q is 2,2-propylidene, each of $R_{14}$ and $R_{16}$ is an allyl radical and each of $R_{15}$ and $R_{17}$ is a hydrogen atom.

8. A composition according to claim 1 comprising a compound of formula VI wherein $R_{26}$ and $R_{27}$ are identical or different and each is hydrogen, methyl or ethyl, and Y is a direct bond, methylene, 2,2-propylidene, —O—, —S—, —SO—, —SO$_2$— or —CO—.

9. A composition according to claim 1 comprising a compound of formula VI wherein $R_{26}$ and $R_{27}$ are hydrogen and Y is 2,2-propylidene.

10. A composition according to claim 1 comprising, per mole of component A, from 0.4 to 1.5 mol of components B and C.

11. A composition according to claim 1 comprising, per mole of component B, from 0.1 to 4 mol of component C.

12. A composition according to claim 10 comprising, per mole of component A, from 0.5 to 1.2 mol of components B and C.

* * * * *